United States Patent [19]

Lupoi

[11] 4,192,666
[45] Mar. 11, 1980

[54] METHOD OF PRODUCING GLASS-CERAMICS WITH UNIFORM BROWN STAIN DECORATION

[75] Inventor: Vincent Lupoi, Butler, Pa.

[73] Assignee: PPG Industries, Inc., Pittsburgh, Pa.

[21] Appl. No.: 942,254

[22] Filed: Sep. 14, 1978

[51] Int. Cl.² .................... C03B 32/00; C03C 17/00
[52] U.S. Cl. .................... 65/33; 65/60 C; 65/60 D; 427/287; 427/229
[58] Field of Search .................... 65/33, 60 C, 60 D; 427/287, 229

[56] References Cited

U.S. PATENT DOCUMENTS

| | | | |
|---|---|---|---|
| 1,906,689 | 5/1933 | Ledig | 427/229 |
| 2,920,971 | 1/1960 | Stookey | 65/33 X |
| 3,022,177 | 2/1962 | Fitch | 106/1 |
| 3,216,834 | 11/1965 | Fitch | 106/1 |
| 3,266,912 | 8/1966 | Murphy | 106/1 |
| 3,313,644 | 4/1967 | Morrissey | 65/60 X |
| 3,428,476 | 2/1969 | Langley | 427/229 |
| 3,511,681 | 5/1970 | Huey, Jr. | 65/33 X |
| 3,528,847 | 9/1970 | Grego et al. | 65/33 X |
| 3,625,718 | 12/1971 | Petticrew | 65/33 X |
| 3,694,299 | 9/1972 | Wagner | 65/60 D X |
| 3,775,154 | 11/1973 | Grego et al. | 65/33 X |
| 3,795,499 | 3/1974 | Ogawa et al. | 65/60 |
| 3,816,161 | 6/1974 | Buckley | 65/33 X |
| 3,850,665 | 11/1974 | Plumat et al. | 65/60 D X |
| 3,852,052 | 12/1974 | Demarest, Jr. | 65/33 X |
| 3,853,612 | 12/1974 | Spanoudis | 65/60 D X |
| 3,940,531 | 2/1976 | Demarest, Jr. | 65/33 X |
| 3,984,591 | 10/1976 | Plumat et al. | 65/60 D X |
| 4,039,698 | 8/1977 | Fraser et al. | 427/229 X |
| 4,129,434 | 12/1978 | Plumat et al. | 65/60 C X |
| 4,148,965 | 4/1979 | Jelli | 65/60 C X |

OTHER PUBLICATIONS

Data Sheet "Metallo-Organics," Engelhard Minerals and Chemicals Corporation.
Data Sheet "Platable Bright Golds," Engelhard Minerals and Chemicals Corporation.
Data Sheet "Resinate Resistor Inks," Engelhard Minerals and Chemicals Corporation.
Data Sheet "Pure Metal Resinates," Engelhard Minerals and Chemicals Corporation.
Ceramic Industry, Jun. 1963, "How to Apply Noble Metals to Ceramics," R. T. Hopper.
"Electrical Applications of Thin-Films Produced by Metallo-Organic Deposition," C. Y. Kuo, Engelhard Minerals and Chemicals Corporation.

*Primary Examiner*—S. Leon Bashore
*Assistant Examiner*—Frank W. Miga
*Attorney, Agent, or Firm*—Dennis G. Millman

[57] ABSTRACT

Glass-ceramic articles having compositional inhomogeneities are provided with uniformly colored brown stain decorations by applying a palladium-containing staining composition onto the articles after they have been subjected to a crystallizing heat treatment, and then subjecting the articles to a second heat treatment to produce the stain decorations.

8 Claims, No Drawings

METHOD OF PRODUCING GLASS-CERAMICS WITH UNIFORM BROWN STAIN DECORATION

BACKGROUND OF THE INVENTION

The present invention relates to an improvement in the process for decorating glass-ceramic materials with patterned stains. More particularly, the invention relates to a mode of staining glass-ceramics whereby greater uniformity of coloration is achieved when inhomogeneities are present in the glass-ceramic articles. The color of the stain produced by the method of this invention is a pleasing shade of brown.

Glass-ceramics are articles in which a major crystalline phase is dispersed in a glassy matrix, and which are individually produced by forming an article from a crystallizable glass and subsequently subjecting the glass article to heat treatment in order to induce crystallization within the body of the glass. The resulting glass-ceramic products are useful because of their relatively low coefficient of thermal expansion and high resistance to thermal shock, which lend the glass-ceramic articles to use in high temperature applications. A particular application for which the use of glass-ceramics has become popular is as cooking surfaces in domestic appliances such as stove tops and microwave oven shelves. Additional information regarding the basic nature of glass-ceramic compositions and methods of making may be found in U.S. Pat. No. 2,920,971 to S. D. Stookey and in U.S. Pat. No. 3,625,718 to R. W. Petticrew.

It is often desired to apply a decorative pattern to a glass-ceramic article, and in order to provide such a decoration with abrasion resistance, it is preferred to impart the decoration of the glass-ceramic by staining, whereby the coloration is contained within the surface portion of the articles. Staining is carried out by applying a stain composition to the crystallizable glass surface in the desired pattern, such as by silk-screening, and then maintaining the crystallizable glass at an elevated temperature to migrate stain-producing ions into the surface portion of the glass-ceramic. For domestic appliance applications, the preferred staining compositions include palladium as the staining agent, which ordinarily produces a neutral gray or blue-gray colored stain without detrimentally affecting the luster of the glass-ceramic surface. Suitable palladium stains are commercially available in the form of palladium resinates in an organic solvent to which significant amounts of inert extender, such as titanium dioxide, may be added. Prior to this invention, crystallization and staining usually have been carried out simultaneously in one heat treatment step.

Occasionally, it is found that glass-ceramic articles stain-decorated in the customary manner with palladium are stained non-uniformly. That is, some areas of the stained pattern achieve a darker gray coloration than other areas of the stained pattern. These non-uniformly stained glass-ceramic articles were unsightly and had to be discarded. It has been theorized that the non-uniformity of the stained patterns was caused by inhomogeneities in the composition of the glass-ceramic articles arising from the melting and forming process. Glass-ceramic compositions require relatively high melting temperatures and are, therefore, prone to losing volatile constituents of the composition during melting, and their melting may be accompanied by leaching of elements from the refractory furnace walls into the melt, both of which lead to inhomogeneities in the product withdrawn from the furnace. It has been found that the darker gray areas in the non-uniformly stained patterns correspond to areas of the glass-ceramic in which the zirconia concentration is slightly greater than that of the bulk of the glass-ceramic articles.

While the conventional gray has been the preferred color for decorating glass-ceramics because of its compatibility with virtually any other color, appliance manufacturers have recently sought to incorporate warmer, "earth" colors in their products, such as various shades of brown. Therefore, it has been considered desirable to produce brown colored stain decorations in glass-ceramics which are components of such appliances. However, a staining material which would produce a rich, uniform brown stain in glass-ceramics, and which would yield a deep, durable stain, a lustrous surface, and accurate reproducibility was not readily available to glass-ceramic manufacturers. The problem was rendered more difficult by the fact that known colorants for glass, ceramics, and glass-ceramics often behave unpredictably, with the resulting coloration being influenced by such factors as the particular composition of the article and the heat treatment to which it is subjected.

Various methods and compositions for stain-decorating glass-ceramics are disclosed in the following U.S. patents:

U.S. Pat. No. 3,313,644—J. W. Morrissey
U.S. Pat. No. 3,528,847—P. Grego et al.
U.S. Pat. No. 3,775,154—P. Grego et al.
U.S. Pat. No. 3,816,161—M. J. Buckley
U.S. Pat. No. 3,852,052—H. M. Demarest, Jr.
U.S. Pat. No. 3,940,531—H. M. Demarest, Jr.

SUMMARY OF THE INVENTION

It has now been found that crystallizable glass articles having inhomogeneities which would normally lead to non-uniform coloration when stain-decorated with palladium can be successfully provided with uniformly colored stain patterns by carrying out the crystallizing and staining steps in separate, sequential heat treatment steps. Moreover, post-crystallization staining of glass-ceramics has been found surprisingly to produce not the usual gray or blue-gray colored stains, but rather a highly desirable family of brown colors, which can can range from a shade described as "shoe leather brown" to a rich, dark "walnut wood brown," depending upon the heating schedule of the staining heat treatment step. The brown color can be obtained regardless of the presence of inhomogeneities in the articles.

DETAILED DESCRIPTION

Crystallizable glass compositions and methods for producing glass-ceramic articles are known in the art and specific reference may be had to the aforementioned U.S. Pat. Nos. 2,920,971 and 3,625,718, the disclosures of which are hereby incorporated by reference.

In general, the crystallizable glass compositions of the present invention may be characterized as having essential inclusions of $SiO_2$, $Al_2O_3$, and $Li_2O$ as crystal-forming constituents, ZnO as a melting aid, and $TiO_2$ or a mixture of $TiO_2$ and $ZrO_2$ as nucleating agents. The alkali metal content of the glass-ceramics is minimized, although a small amount of $K_2O$ is typically included. Small amounts of melting and fining aids, such as fluorine, chlorine, antimony, or arsenic may also be included. The presence of arsenic and/or antimony has also been found to have a beneficial effect on the staining process. An example of a crystallizable glass composition is as follows:

| Ingredient | Percent by Weight | |
|---|---|---|
| | Range | Preferred Embodiment |
| $SiO_2$ | 67–71 | 70.22 |
| $Al_2O_3$ | 18–21 | 19.21 |
| $TiO_2$ | 1.4–5.0 | 2.15 |
| $ZrO_2$ | 0–2.0 | 1.58 |
| $Sb_2O_3$ | 0–1.0 | 0.38 ($Sb_2O_5$) |
| $As_2O_5$ | 0–1.0 | 0.01 |
| $Li_2O$ | 2.5–4.0 | 3.99 |
| $Na_2O$ | 0–1.0 | 0.30 |
| $K_2O$ | 0–1.0 | 0.27 |
| $Cl_2$ | 0–0.2 | — |
| ZnO | 0.5–2.0 | 1.59 |
| $F_2$ | 0–0.5 | 0.24 ($F^-$) |
| MgO | 0–3.0 | 0 |
| CaO | 0–4.0 | 0 |
| $P_2O_5$ | 0–1.5 | 0 |

A glass of the above preferred composition may be melted from the following batch ingredients:

| Ingredient | Parts by Weight |
|---|---|
| Silica | 700 |
| Hydrated alumina | 296 |
| Lithium carbonate | 83 |
| Zinc zirconium silicate | 31 |
| Zinc oxide | 10.5 |
| Titanium dioxide | 15.0 |
| Lithium fluoride | 13.5 |
| Soda ash | 4.0 |
| Lithium sulfate | 6.0 |
| Potassium carbonate | 2.5 |
| Antimony oxide | 4.0 |
| Total | 1165.5 |

These materials may be melted on a continuous basis in a refractory melting chamber, from one end of which, in one embodiment, a ribbon may be withdrawn and formed into a flat sheet of glass by rolling in accordance with techniques similar to the plate glass method. Following forming, the glassy sheet is cooled and cut to the desired size. Optionally, the glassy sheet also may be ground and polished.

Crystallization of the formed glassy articles (e.g., plates) takes place in a heat treatment chamber into which the articles are placed at room temperature. The temperature is steadily raised over a period of several hours to about 1300° F. (700° C.) or higher, which temperature is maintained for several hours to initiate nucleation of crystallization sites within the bodies of the glassy articles. The temperature is then increased to about 1850° F. (1010° C.) to convert a major portion (at least 50 percent) of the glass to small, dispersed crystals. The crystal which first forms is beta-eucryptite, which is subsequently transformed by the heat treatment to beta-spodumene crystals. Preferably, crystallization is carried out until the article is about 98 percent by weight crystal phase, with 2 percent remaining as a glassy phase. In its final state, the crystalline phase is a solid solution of beta-spodumene and silica.

A specific example of a preferred heat treating schedule is as follows:
Raise temperature from room temperature to 1100° F. (593° C.) over 3 hours;
Hold at 1100° F. (593° C.) for 2 hours;
Raise temperature to 1285° F. (696° C.) over 2 hours;
Raise temperature to 1325° F. (718° C.) over 1 hour;
Increase temperature to 1385° F. (752° C.) over 6 hours;
Hold at 1385° F. (752° C.) for 2 hours;
Increase temperature to 1400° F. (760° C.) over 2 hours;
Increase temperature to 1650° F. (899° C.) over 1.5 hours;
Hold at 1650° F. (899° C.) for 2 hours.

From this point crystallization is ordinarily completed by further increasing the temperature to 1850° F. (1010° C.) over 1.5 hours, holding at 1850° F. (1010° C.) for 3 hours and then cooling to room temperature over a period of about 3 hours. However, for purposes of the present invention, it is preferred to stop the crystallization heat treatment after holding at 1650° F. (899° C.), even though conversion to the beta-spodumene crystal form is incomplete, since the subsequent heat treatment required for stain-decorating the glass-ceramic articles may be employed to carry crystallization to the desired point of completion. The result is a savings in thermal energy.

A specific palladium glass colorant which may be used with the present invention is identified as "Dark Brown A-1454" by the manufacturer, Englehard Industries, Inc., Newark, N.J., and includes a palladium resinate as the active staining agent, along with a small amount of bismuth in an organic carrier. The colorant contains about 2.26 weight percent palladium and 0.42 weight percent bismuth. It should be noted that the type of colorants used for staining glass-ceramics are often not marketed primarily for such a use, but rather for producing surface decorations or conductive films on glass, ceramics, glass-ceramics, and other materials. But when in contact with glass-ceramics under the type of thermal conditions disclosed herein, stains rather than films are produced. While the above-identified product is designated as a "dark brown" colorant, it should be understood that this designation relates only to its effect on vitreous glasses, where it apparently behaves not as a stain, but as a surface decoration. On glass-ceramics, the above-identified product yields a subsurface stain having the conventional grayish color when crystallization and staining are carried out in a single heat treatment.

About 50 grams of the colorant are mixed with about 450 grams of titanium dioxide extender, which is preferably in the anatase crystal form as taught in U.S. Pat. No. 3,816,161 to M. J. Buckley. The colorant and titanium dioxide may be mixed in a ball mill with a suitable liquid vehicle to establish the desired viscosity for use in the particular decorating technique to be employed. For use in the preferred silk-screen decorating method pine oil is the preferred vehicle, for example: "Drakelene Oil" sold by Hercules, Inc., Drakenfeld Division, Washington, Pa. A viscosity of about 50,000 centipoise is typically considered suitable for silk-screening.

The strain mixture is applied to surface portions of the crystallized glass-ceramic articles in decorative patterns or to an entire surface. While silk-screening is the preferred method of mass-producing identical patterns, any method of applying the stain mixture could be used, such as brushing, stenciling, or spraying.

The crystallized glass-ceramic articles with the stain material applied thereto are then returned to the heating chamber where they are heated to a temperature sufficient to drive the stain-producing palladium ions into surface portions of the glass. In the case of the specific heat treatment schedule set forth above, wherein crystallization was stopped short of completion, the second heat treatment consists of heating the heating chamber to a temperature of 1950° F. (1066° C.) over a period of about ten hours (or approximately the maximum rate of the heating chamber) and holding at 1950° F. (1066° C.) for one hour, after which the heat is turned off and the heating chamber is permitted to cool over a period of several hours. At the conclusion of the second heat treatment, the residue of the staining material is wiped from the surfaces of the glass-ceramic articles. The stain patterns which are formed are found to be a uniform brown color with a lustrous surface appearance and good abrasion resistance. When the crystallizable glass is selected from a production run known to have a high incidence of inhomogeneities which cause non-uniformity in the conventional gray stains, and is stained with palladium after crystallization in accordance with the present invention, the resulting brown stain is still found to be essentially free from non-uniformity.

For producing stains having the darkest shades of brown, the following schedule is preferred for the staining heat treatment: heat at approximately the maximum practical rate from room temperature to 1600° F. (870° C.); increase the temperature at 75° F. (42° C.) per hour to 1950° F. (1066° C.); hold at 1950° F. (1066° C.) for 1 hr.; and permit the chamber to cool to about 600° F. (320° C.) before opening and removing the articles.

The final appearance of the crystallized articles, other than the stained areas, is an almost opaque, milk-white to grayish-white color when subjected to the preferred heat treatment described above. By employing other heat treatment schedules, glass-ceramics which are transparent or translucent may be produced.

Specific examples disclosed herein have been set forth for the purpose of illustrating applicant's preferred mode and it should be understood that other variations and modifications may be resorted to within the scope and spirit of the claims which follow.

I claim:

1. A method for producing uniformly colored brown stain decorations in glass-ceramic articles which include inhomogeneities which affect stain coloration, comprising the steps of:
    forming a glassy article from a crystallizable glass composition comprising $SiO_2$, $Al_2O_3$, $Li_2O$, ZnO, and as a crystal growth nucleating agent, either $TiO_2$ or a mixture of $TiO_2$ and $ZrO_2$;
    heating said glassy article to a temperature at which a major portion of the article crystallizes within a glassy matrix, thereby forming a glass-ceramic;
    applying a palladium-containing stain-decorating composition onto the surface of the crystallized glass-ceramic article; and
    heating the crystallized glass-ceramic article with the stain-decorating composition thereon so as to migrate palladium ions from the composition into surface portions of the article, thereby producing a uniformly colored, brown stained pattern in the surface of the article.

2. A method for producing brown colored stain decorations in glass-ceramic articles comprising the steps of:
    forming a glassy article from a crystallizable glass composition comprising $SiO_2$, $Al_2O_3$, $Li_2O$, ZnO, and as a crystal growth nucleating agent, either $TiO_2$ or a mixture of $TiO_2$ and $ZrO_2$;
    heating said glassy article to a temperature at which a major portion of the article crystallizes within a glassy matrix, thereby forming a glass-ceramic;
    applying a palladium-containing stain-decorating composition onto the surface of the crystallized glass-ceramic article; and
    heating the crystallized glass-ceramic article with the decorating composition thereon so as to migrate palladium ions from the composition into surface portions of the article, thereby producing a uniformly colored, brown stained pattern in the surface of the article.

3. The method of claim 1 or 2 wherein the glassy article is formed from a crystallizable glass composition comprising:

|  | weight percent |
| --- | --- |
| $SiO_2$ | 67–71 |
| $Al_2O_3$ | 18–21 |
| $TiO_2$ | 1.4–5.0 |
| $ZrO_2$ | 0–2.0 |
| $Sb_2O_3$ | 0–1.0 |
| $As_2O_5$ | 0–1.0 |
| $Li_2O$ | 2.5–4.0 |
| $Na_2O$ | 0–1.0 |
| $K_2O$ | 0–1.0 |
| $Cl_2$ | 0–0.2 |
| ZnO | 0.5–2.0 |
| $F_2$ | 0–0.5 |

4. The method of claim 1 or 2 wherein the step of heating the glassy article to crystallize the article is stopped before transformation to a final crystal form is attained, and thereafter completing the transformation to the final crystal form during the final, stain-producing heat treatment.

5. The method of claim 1 or 2 wherein the application of the stain-decorating composition onto the article is carried out by silk-screening.

6. The method of claim 1 or 2 wherein the stain-decorating composition applied onto the article includes titanium dioxide.

7. The method of claim 1 or 2 wherein the stain-decorating composition applied onto the article includes bismuth and titanium dioxide.

8. The method of claim 1 or 2 wherein the temperature and total time of the heat treatments are controlled so that the article is transformed to comprise predominantly beta-spodumene throughout the body of the article.

* * * * *